United States Patent
Toyota et al.

(10) Patent No.: US 6,419,847 B1
(45) Date of Patent: Jul. 16, 2002

(54) FERRITE MAGNET POWDER AND MAGNET USING SAID MAGNET POWDER, AND METHOD FOR PREPARING THEM

(75) Inventors: Sachio Toyota, Takatsuki; Seiichi Hosokawa, Takarazuka; Shuji Anamoto; Isamu Furuchi, both of Saga, all of (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 09/582,238
(22) PCT Filed: Nov. 25, 1999
(86) PCT No.: PCT/JP99/06558
  § 371 (c)(1),
  (2), (4) Date: Jul. 19, 2000
(87) PCT Pub. No.: WO00/31756
  PCT Pub. Date: Jun. 2, 2000

(30) Foreign Application Priority Data

Nov. 26, 1998  (JP) .......................... 10-336026

(51) Int. Cl.$^7$ .......................... H01F 1/11; C01G 49/08; C04B 35/40
(52) U.S. Cl. .................. 252/62.57; 252/62.63
(58) Field of Search ............... 252/62.57, 62.63

(56) References Cited

U.S. PATENT DOCUMENTS

| | | | |
|---|---|---|---|
| 3,723,587 A | 3/1973 | Iwase et al. | 252/62.63 |
| 4,636,433 A | 1/1987 | Kubo et al. | 428/328 |
| 5,846,449 A | 12/1998 | Taguchi et al. | 252/62.62 |
| 5,958,284 A | 9/1999 | Takami et al. | 252/62.63 |
| 6,086,781 A | * 7/2000 | Taguchi et al. | 252/62.57 |
| 6,139,766 A | * 10/2000 | Taguchi et al. | 252/62.57 |

FOREIGN PATENT DOCUMENTS

| | | |
|---|---|---|
| JP | 63-138708 | 6/1988 |
| JP | 63-186402 | 8/1988 |
| JP | 10149910 | * 6/1998 |

OTHER PUBLICATIONS

Iida et al., "M–Type Ferrite Magnets with High Coercivity", p. 92, 1998, TDK Corporation, 20aE–2. No month.

Nishio et al., "Magnetocrystalline Anisotrophy of M–type Ferrite Magnets with High Coercivity", p. 93, 1998, TDK Corporation, 20aE–3. No month.

Mones et al., "Cation Substitutions in BaFe12O19", 1958, pp. 217–222, J. Phys. Chem. Solid, Pergamon Press, vol. 4. No month.

Smolenskii et al., "Investigation of Ferrimagnets with the Structure of Magnetoplumbite and Garnet in Strong Pulse Magnetic Fields", 1961, pp. 1405–1408, Institute of Semiconductors, Academy of Sciences of the USSR.

* cited by examiner

Primary Examiner—C. Melissa Koslow
(74) Attorney, Agent, or Firm—Nixon Peabody LLP; Jeffrey L. Costellia

(57) ABSTRACT

An La—Co ferrite magnet powder, in which Sr and Fe are replaced with La and Co, respectively, is made by carrying out a calcination process at a temperature higher than 1300° C. and equal to or lower than 1450° C. Fe has a magnetic moment oriented upwardly with respect to a crystal c-axis at a number of sites thereof, and also has an opposite magnetic moment oriented downwardly with respect to the crystal c-axis at another number of sites thereof. And Fe is replaced with Co at the greater number of sites thereof. As a result, high coercivity is attained. In this manner, coercivity can be increased while suppressing decrease in saturation magnetization $\sigma_s$.

8 Claims, 5 Drawing Sheets

FERRITE MAGNET POWDER AND MAGNET USING SAID MAGNET POWDER, AND METHOD FOR PREPARING THEM

TECHNICAL FIELD

The present invention relates to ferrite magnet powder, magnet made from the magnet powder and methods for making the powder and the magnet.

BACKGROUND ART

Ferrite is a generic term for various compounds containing an oxide of a divalent anionic metal and trivalent iron and has found a wide variety of applications in motors, electric generators, and so on. Typical materials for a ferrite magnet include Sr or Ba ferrites with a magnetoplumbite hexagonal structure ($SrFe_{12}O_{19}$ or $BaFe_{12}O_{19}$). Each of these ferrites can be made from iron oxide and a carbonate of strontium (Sr) or barium (Ba) at a relatively low cost by a powder metallurgical process.

A basic composition of a magnetoplumbite ferrite is usually represented by a chemical formula of $MO \cdot nFe_2O_3$, where M is a metal element to be divalent anions and is selected from the group consisting of Sr, Ba, Pb and so on. In the ferrite, iron ions ($Fe^{3+}$) located at respective sites have spin magnetic moments and are bonded together by super-exchange interaction with oxygen ions ($O^{-2}$) interposed therebetween. At each of these sites, $Fe^{3+}$ has an "upward" or "downward" magnetic moment with respect to the c-axis. Since the number of sites with the "upward" magnetic moment is different from that of sites with the "downward" magnetic moment, the ferrite crystal exhibits ferromagnetism as a whole (and is, called a "ferrimagnetism").

It is known that the remanence $B_r$, which is one of the indices representing the magnetic properties of a magnetoplumbite ferrite magnet, can be improved by enhancing $I_s$ of the crystal or increasing the density of a ferrite sintered compact and aligning the orientations of the crystal more fully. It is also known that the coercivity $H_{CJ}$ of a ferrite magnet can be enhanced by increasing the fraction of single domain crystals existing in the magnet. However, if the density of the sintered compact is increased to improve the remanence $B_r$, then the ferrite crystals grow at a higher rate, thus decreasing the coercivity $H_{CJ}$. Conversely, if the grain sizes are controlled with the addition of $Al_2O_3$, for example, to increase the coercivity, then the density of the sintered compact decreases, resulting in decrease of the remanence. Compositions, additives and production conditions for ferrites have been researched and developed from various angles to improve these magnetic properties of a ferrite magnet. However, it has been difficult to develop a ferrite magnet with its remanence and coercivity both improved.

The present applicant developed a ferrite magnet with the coercivity improved by adding Co to the source material and without decreasing the remanence thereof (see Japanese Patent Gazette for Opposition Nos. 4-40843 and 5-42128).

After that, a ferrite magnet with the saturation magnetization $\sigma_s$ improved by replacing Fe and Sr with Zn and La, respectively, was proposed (see Japanese Laid-Open Publication Nos. 9-115715 and 10-149910). As described above, a ferrite magnet is a ferrimagnetism in which the magnetic moments at respective sites of $Fe^{3+}$ are in the opposite directions, and therefore has relatively low saturation magnetization. However, according to the above-identified laid-open publications, if ions with a smaller magnet moment than that of Fe are placed at particular sites of Fe ions, then the number of sites with the "downward" magnet moment will decrease and the saturation magnetization $\sigma_s$ will increase. Examples of using Nd or Pr instead of La and using Mn, Co or Ni instead of Zn are also described in these publications.

A ferrite magnet with a composition $Sr_{1-x}La_xCo_xFe_{12-x}O_{19}$, which additionally contains La and Co to increase both the coercivity $H_{CJ}$ and saturation magnetization $\sigma_s$ thereof, is disclosed in "Digests of the 22th Annual Conference on Magnetics in Japan" (which was distributed on Sep. 20, 1998).

However, even these ferrite magnets cannot exhibit sufficiently improved coercivity and saturation magnetization. In particular, if the $Sr_{1-x}La_xCo_xFe_{12-x}O_{19}$ compound, in which Fe and Sr are replaced with Co and La, respectively, is calcined at such a temperature as that disclosed in Japanese Laid-Open Publication No. 10-149910 (i.e., 1200° C.), then the resultant coercivity is not high enough although rather high saturation magnetization $\sigma_s$ is attainable.

An article included in "Digests of the 22th Annual Conference on Magnetics in Japan" (which was distributed on Sep. 20, 1998) reports that coercivity would be increased to a certain degree by replacing Fe with Co, not Zn. However, the article does not specify the causes. In addition, neither coercivity nor remanence seems to be sufficiently improvable.

In view of these respects, a primary object of the present invention is to provide a ferrite magnet powder with saturation magnetization and coercivity both improved and a magnet made from the magnet powder.

DISCLOSURE OF INVENTION

An inventive magnet powder has a ferrite primary phase represented as $(1-x)SrO \cdot (x/2)La_2O_3 \cdot (n-y/2)Fe_2O_3 \cdot yCoO$, where x and y represent mole fractions and $0.1 \leq x \leq 0.4$, $0.1 \leq y \leq 0.4$ and $5.5 \leq n \leq 6.5$. Fe has a magnetic moment oriented upwardly with respect to a crystal c-axis at a number of sites thereof, and also has an opposite magnetic moment oriented downwardly with respect to the crystal c-axis at another number of sites thereof. And Fe is replaced with Co at the greater number of sites thereof.

The magnet powder is preferably calcined at a temperature higher than 1300° C.

In a preferred embodiment, the magnet powder shows a magnetic anisotropy field $H_A$ of 1750 kA/m (22 kOe) or more and a saturation magnetization $\sigma_s$ of 84.78 μWbm/kg (67.5 emu/g) or more at room temperature.

An inventive bonded magnet is characterized by containing the magnet powder. On the other hand, an inventive sintered magnet is characterized by being made from the magnet powder.

An inventive method for making a magnet powder includes the steps of: preparing a source material blended powder, in which oxide powders of La and Co are added to powders of $SrCo_3$ and $Fe_2O_3$, respectively; calcining the source material blended powder at a temperature higher than 1300° C. and equal to or lower than 1450° C., thereby forming a ferrite calcine with the composition of $(1-x)SrO \cdot (x/2)La_2O_3 \cdot (n-y/2)Fe_2O_3 \cdot yCoO$, where $0.1 \leq x \leq 0.4$, $0.1 \leq y \leq 0.4$ and $5.5 \leq n \leq 6.5$; and pulverizing the calcine. Note that the step of preparing the source material blended powder refers to not only making such a source material blended powder from the beginning, but also purchasing and using a source material blended powder that was made by others and blending powders prepared by others.

The calcining step is preferably carried out at a temperature equal to or higher than 1350° C.

An inventive method for producing a magnet includes the steps of: preparing a source material blended powder, in which oxide powders of La and Co are added to powders of $SrCo_3$ and $Fe_2O_3$, respectively; calcining the source material blended powder at a temperature higher than 1300° C. and equal to or lower than 1450° C., thereby forming a ferrite calcine with the composition of $(1-x)SrO.(x/2)La_2O_3.(n-y/2)Fe_2O_3.yCoO$, where $0.1 \leq x \leq 0.4$, $0.1 \leq y \leq 0.4$ and $5.5 \leq n \leq 6.5$; pulverizing the calcine to obtain a ferrite magnet powder; and, shaping and sintering the ferrite magnet powder.

Another inventive method for producing a magnet includes the steps of: preparing a source material blended powder, in which oxide powders of La and Co are added to powders of $SrCo_3$ and $Fe_2O_3$, respectively; calcining the source material blended powder at a temperature higher than 1300° C. and equal to or lower than 1450° C., thereby forming a ferrite calcine with the composition of $(1-x)SrO.(x/2)La_2O_3.(n-y/2)Fe_2O_3.yCoO$, where $0.1 \leq x \leq 0.4$, $0.1 \leq y \leq 0.4$ and $5.5 \leq n \leq 6.5$; pulverizing the calcine to obtain a ferrite magnet powder; and forming a bonded magnet from the ferrite magnet powder.

The calcining step is preferably carried out at a temperature equal to or higher than 1350° C. Another inventive magnet powder has a ferrite primary phase represented as $(1-x)AO(x/2)R_2O_3.(n-y/2)Fe_2O_3.yCoO$, where A is at least one element selected from the group consisting of Sr. Ba, Ca and Pb; R includes at least one element selected from the group consisting of rare-earth elements including Y and Bi; x and y represent mole fractions; and $0.1 \leq x \leq 0.4$, $0.1 \leq y \leq 0.4$ and $5.5 \leq n \leq 6.5$. Fe has a magnetic moment orient upwardly with respect to a crystal c-axis at a number of sites thereof, and also has an opposite magnetic moment oriented downwardly with respect to the crystal c-axis at another number of sites thereof. And Fe is replaced with Co at the greater number of sites thereof.

The magnet powder is preferably calcined at a temperature higher than 1300° C.

Still another inventive magnet is characterized by being made from the magnet powder.

BEST MODE FOR CARRYING OUT THE INVENTION

The inventive magnet powder has a magnetoplumbite ferrite primary phase represented as $(1-x)SrO.(x/2)La_2O_3.(n-y/2)Fe_2O_3.yCoO$. Part of Sr is replaced with La by the amount x, where $0.1 \leq x \leq 0.4$. Part of Fe is replaced with Co by the amount y, where $0.1 \leq y \leq 0.4$. Also, $5.5 \leq n \leq 6.5$.

When Fe is replaced with Co, the saturation magnetization increases so long as the calcining temperature falls within a normal temperature range (i.e., around 1200° C.) However, we observed decrease in saturation magnetization when the calcining temperature was raised to a level exceeding the normal temperature range.

The present inventors found that if La and Co are added to a source material blended powder and if the mixture is calcined at a temperature higher than 1300° C., then coercivity (i.e., magnetic anisotropy field) can be increased while suppressing the decrease in saturation magnetization. This is probably because the sites where Fe is replaced with Co change with the rise in calcining temperature, thus improving the magnetic properties. More specific reasons are as follows.

In a magnetoplumbite ferrite with the stoichiometric composition of $SrO.6(Fe_2O_3)$, twelve $Fe^{3+}$ ions are contained per unit cell. Of these ions, eight $Fe^{3+}$ ions have a magnetic moment upwardly oriented with respect to the crystal c-axis, while the other four $Fe^{3+}$ ions have a magnetic moment downwardly oriented thereto. In this specification, the orientation of the magnetic moment of the eight $Fe^{3+}$ ions, which are found at the greater number of sites, is represented as "upward". Alternatively, this orientation may also be regarded as "downward" and the orientation of the magnetic moment of the remaining four $Fe^{3+}$ ions may, be regarded as "downward". In the following description, the orientation of the magnetic moment found at the greater number of sites will be regarded as "upward".

Figure 5A:
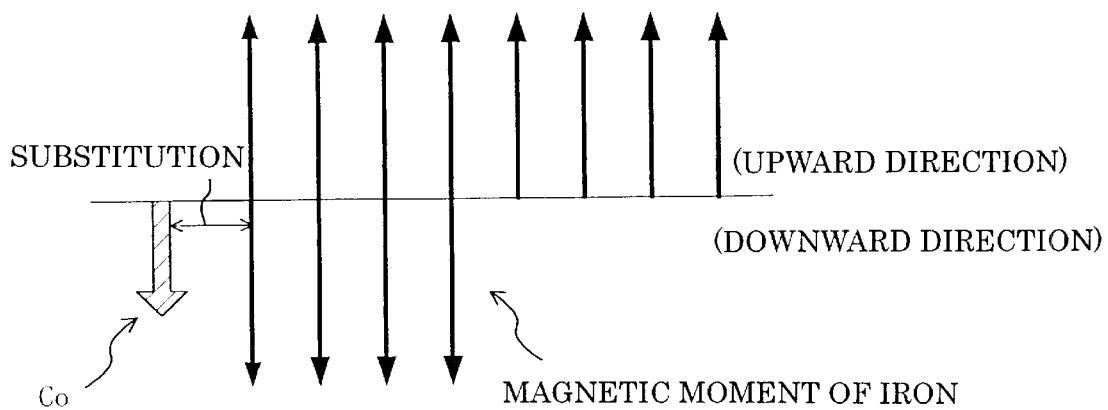
FIG. 5(a) schematically illustrates how Fe is replaced with Co when the calcining temperature is 1300° C. or less, and FIG. 5(b) schematically illustrates how Fe is replaced with Co when the calcining temperature is higher than 1300° C.
Figure 5B:
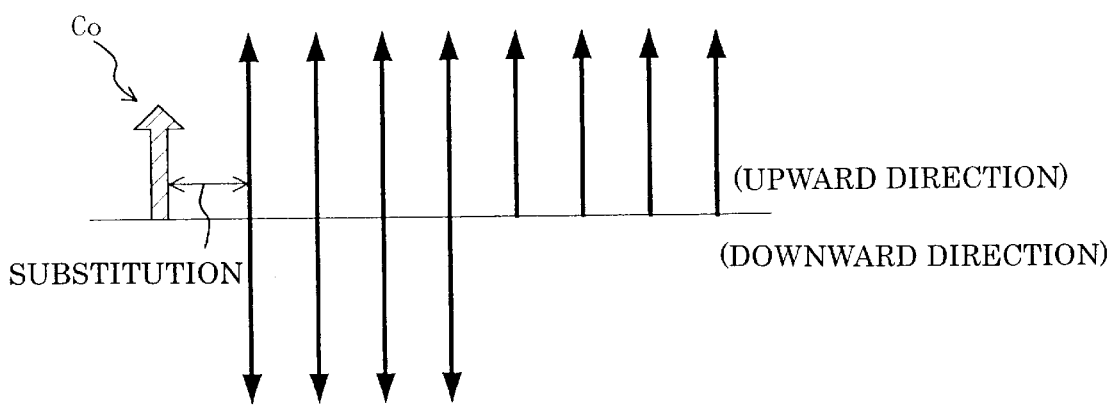

In partially replacing Fe with Co in such a ferrite, Fe with the downward magnetic moment would be replaced with Co at a calcining temperature between 1200 and, 1300° C., both inclusive (FIG. 5(a)). At a calcining temperature higher than 1300° C. on the other hand, Fe with the upward magnetic moment would be replaced with Co (FIG. 5(b)). The magnetic moment of Co is smaller in magnitude than that of Fe. Thus, if Fe with the downward magnetic moment is replaced with Co, then the saturation magnetization of the ferrite will increase. However, if Fe with the upward magnetic moment is replaced with Co, then the saturation magnetization of the ferrite will slightly decrease but the magnetic anisotropy field (i.e., coercivity) will increase sufficiently as shown in FIG. 5(b).

Nevertheless, if the calcining temperature exceeds 1450° C., then the crystal grains will grow excessively and various inconveniences will be caused. For example, it will take too much time to carry out a pulverization process.

Taking these results into account, the calcining temperature is preferably set to a temperature higher than 1300° C. and equal to or lower than 1450° C. To attain even more enhanced magnetic properties, the calcining temperature preferably falls within a range from 1350 to 1450° C.

According to the present invention, excellent magnetic properties are attainable. Specifically, the magnetic anisotropy field $H_A$ at room temperature exceeds 19×79.58 kA/m (=19 kOe=1512 kA/m) and the saturation magnetization $\sigma_s$ exceeds 6.5×1.256 μWbm/kg (=66.5 emu/g=83.52 μWbm/kg). Also, by controlling the mole fractions (i.e., the amounts replaced) and the calcining temperature, the magnetic anisotropy field $H_A$ can be increased to 19.5×79.58 kA/m (=19.5 kOe=1631 kA/m) and to 26×79.58 kA/m (=26 kOe= 2069 kA/m), while the saturation magnetization $\sigma_s$ can be increased to 69.2×1.256 μWbm/kg (=69.2 emu/g=86.91

$\mu$Wbm/kg) and to 67.7×1.256 $\mu$Wbm/kg (=67.7 emu/g= 85.03 $\mu$Wbm/kg).

According to the present invention, since $Fe^{3+}$ ions in a magnetoplumbite ferrite are replaced with $Co^{2+}$ ions having a different valence, part of Sr is replaced with La to compensate for the difference in valence. Thus, the substitution amount x is preferably approximately equal to the substitution amount y. However, the present invention is not limited to the embodiment where x=y.

Next, an inventive method for making the magnet powder will be described.

First, powders of $SrCO_3$ and $Fe_2O_3$($\alpha$-ferric oxide) are blended at a mole fraction ratio between 1:5.5 and 1:6.5. At this time, $La_2O_3$, CoO and so on are added to the source material blended powder. The primary grain sizes of $SrCO_3$, $Fe_2O_3$, $La_2O_3$, and CoO powders are about 0.8 $\mu$m, about 0.5 $\mu$m, about 1.0 $\mu$m and about 1.0 $\mu$m, respectively.

In this manner, La and Co are preferably added as powders of La and Co oxides. Alternatively, La and Co may be added as powders of respective non-oxide; compounds, e.g., carbonates, hydroxides or nitrates.

If necessary, any other compound containing $SiO_2$, $CaCo_3$, $SrCO_3$, $Al_2O_3$ or $Cr_2O_3$ may be added to the powder by about 1% by weight.

The blended source material powder is heated to a temperature between 1300 and 1450° C. in the air using a rotary kiln, for example, and solidified, thereby forming a magnetoplumbite ferrite compound. This process will be herein called a "calcination process" and the resulting compound will be herein called a "calcine". The calcination time is preferably 1 to 5 hours.

The calcine obtained by this calcination process has a magnetoplumbite ferrite primary phase represented by the following chemical formula:

$$(1-x)SrO.(x/2)La_2O_3.(n-y/2)Fe_2O_3.yCoO$$

(where $0.1 \leq x=y \leq 0.4$ and $5.5 \leq n \leq 6.5$) and has an average grain size between 1 and 10 $\mu$m.

By pulverizing or milling this calcine, the inventive magnet powder can be obtained.

Figure 1:
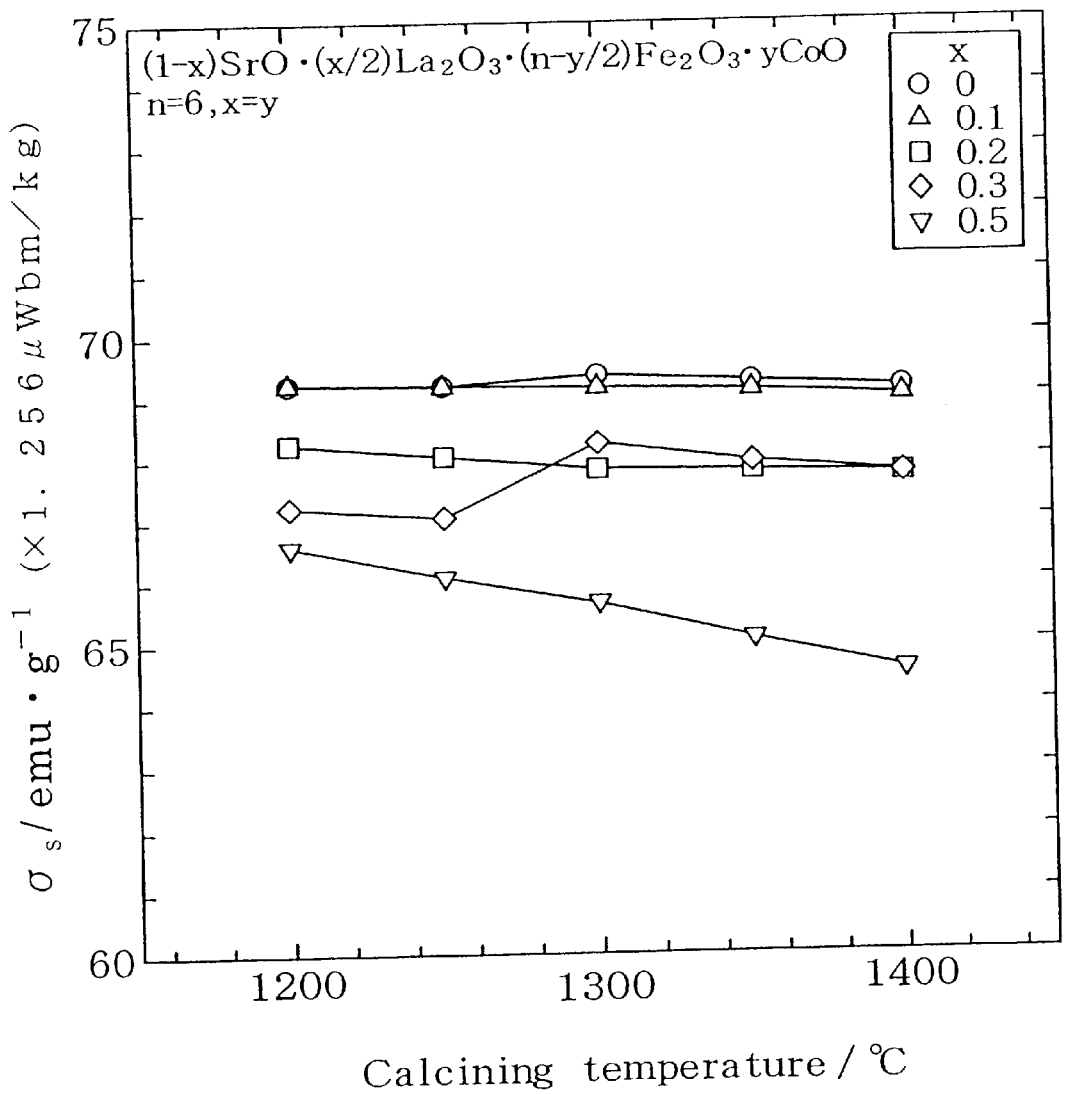
FIG. 1 is a graph illustrating the dependence of the saturation magnetization $\sigma_s$ on the calcining temperature for examples of the present invention and comparative examples.
Figure 2:
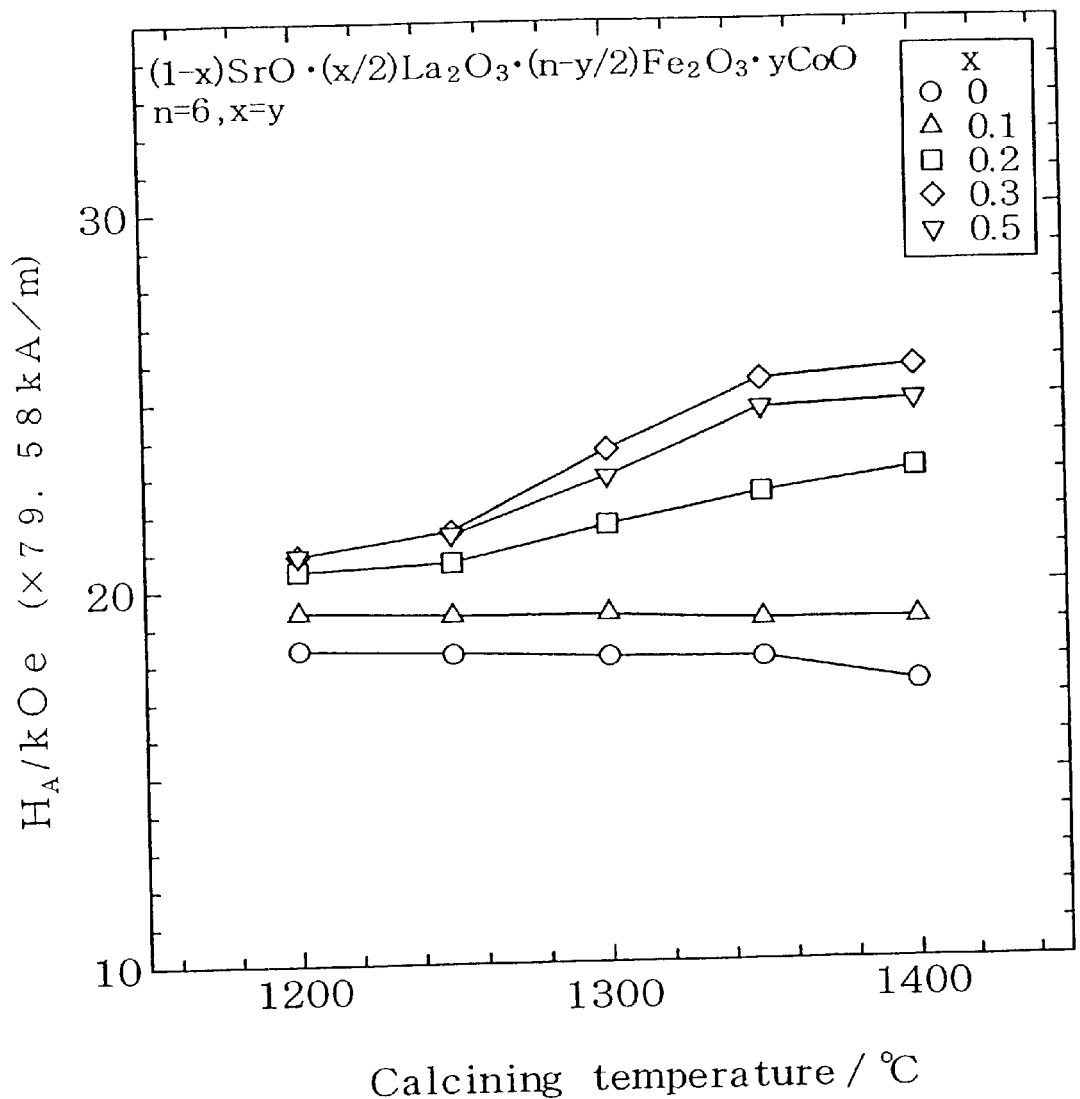
FIG. 2 is a graph illustrating the dependence of the magnetic anisotropy field $H_A$ on the calcining temperature for examples of the present invention and comparative examples.

FIGS. 1 and 2 illustrate the dependence of the magnetic properties on the calcining temperature for various samples with respectively different amounts replaced x. In FIG. 1, the ordinate represents the saturation magnetization, while the abscissa represents the substitution amount x (=y). In FIG. 2, the ordinate represents the magnetic anisotropy field, while the abscissa represents the substitution amount x (=y).

FIGS. 1 and 2 illustrate respective measured values for the samples, of which the amounts replaced x are between 0 and 0.5. The saturation magnetization $\sigma_s$ and the magnetic anisotropy field $H_A$ were both measured at room temperature (23° C.) with an open flux magnetometer using pulsed magnetic fields. The method of measurement is as follows.

In general, the magnetization curve as defined in an intense magnetic field created by a ferromagnetic or ferrimagnetic is given by

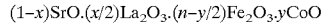

$$I=I_s(1-a/H-b/H^2+...)+\chi_0\mu_0H$$

This equation is called a saturation asymptotic formula. The first term is generated because the magnetic moments are not completely aligned with the direction of the magnetic field due to magneto crystalline anisotropy, for example. The second term represents that the magnitude of the magnetic moment itself increases with the strength of the magnetic field. In obtaining the spontaneous magnetization $I_s(\sigma_s)$ experimentally, if the magnetic anisotropy is not particularly large (in the range from $K_1$ to $10^4$ J/m$^3$), the term $b/H^2$ is almost negligible even for a magnetic field H of $10^6$ A/m or more. Thus, as for a magnetic field H of $10^6$ A/m or more, $I_s$ can be obtained by seeing if the term $\chi_0H$ or a/H exists and by extrapolating H and 1/H into zero, respectively.

Also, in a magnetization curve obtained by measuring the properties of a calcined magnetoplumbite Sr ferrite powder with a mole fraction of 6.0 (i.e., $SrO.6Fe_2O_3$), the magnetization I becomes linear when the external magnetic field H is 30×79.58 kA/m (=30 kOe=2387 kA/m) or more. Thus, the above equation will be a linear equation of H in the second term because the first term becomes $I_s$. Accordingly, by extrapolating H into zero, its y segment is set equal to $\sigma_s$. As a result, the saturation magnetization of $SrO.6Fe_2O_3$ was (69.2 ±0.1)×1.256 $\mu$Wbm/kg. The magnetic anisotropy field $H_A$ was obtained by measuring second-order-differentiated susceptibility using the same pulsed magnetization measuring apparatus. As a result, $H_A$ of $SrO.6Fe_2O_3$ measured 1.43 MA/m (18 kOe).

Figure 3:
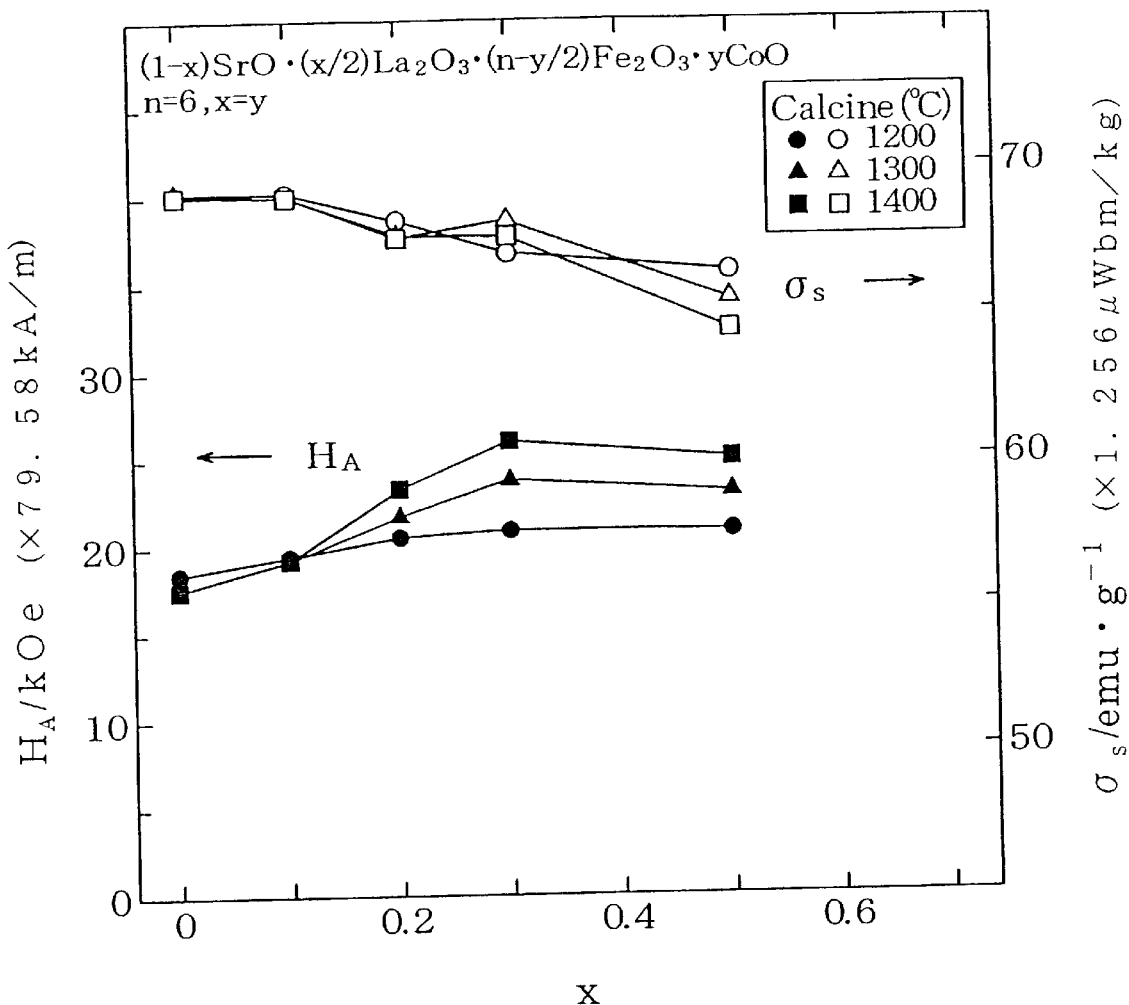
FIG. 3 is a graph illustrating the dependence of the saturation magnetization $\sigma_s$ and magnetic anisotropy field $H_A$ on the substitution amount for examples of the present invention and comparative examples, where x=y.

FIG. 3 illustrates the dependence of the magnetic anisotropy field $H_A$ and saturation magnetization $\sigma_s$ on the amounts replaced.

The following points are clear from the graphs shown in FIGS. 1 through 3.

1. When La and Co are added, the magnetic properties depend on the calcining temperature. In particular, the magnetic anisotropy field $H_A$ greatly depends on the calcining temperature if the substitution amount x of La and Co is large.
2. If the substitution amount x is 0.1 or more, the magnetic anisotropy field $H_A$ increases up to 18 kOe or more. Also, the higher the calcining temperature, the more significantly the magnetic anisotropy field $H_A$ increases. The magnetic anisotropy field $H_A$ reaches its maximum when the substitution amount x is 0.3 (FIG. 3).
3. If the substitution amount x is 0.4 or more, the saturation magnetization $\sigma_s$ tends to decrease as the calcining temperature rises (FIG. 3).
4. To attain a magnetic anisotropy field $H_A$ of 22×79.58 kA/m (=22 kOe=1750 kA/m) or more while maintaining the saturation magnetization $\sigma_s$ at 67.5×1.256 $\mu$Wbm/kg (=67.5 emu/g =84.78 $\mu$Wbm/kg) or more, the substitution amount x should be between 0.2 and 0.3 and the calcining temperature should exceed 1300° C.

Figure 4:
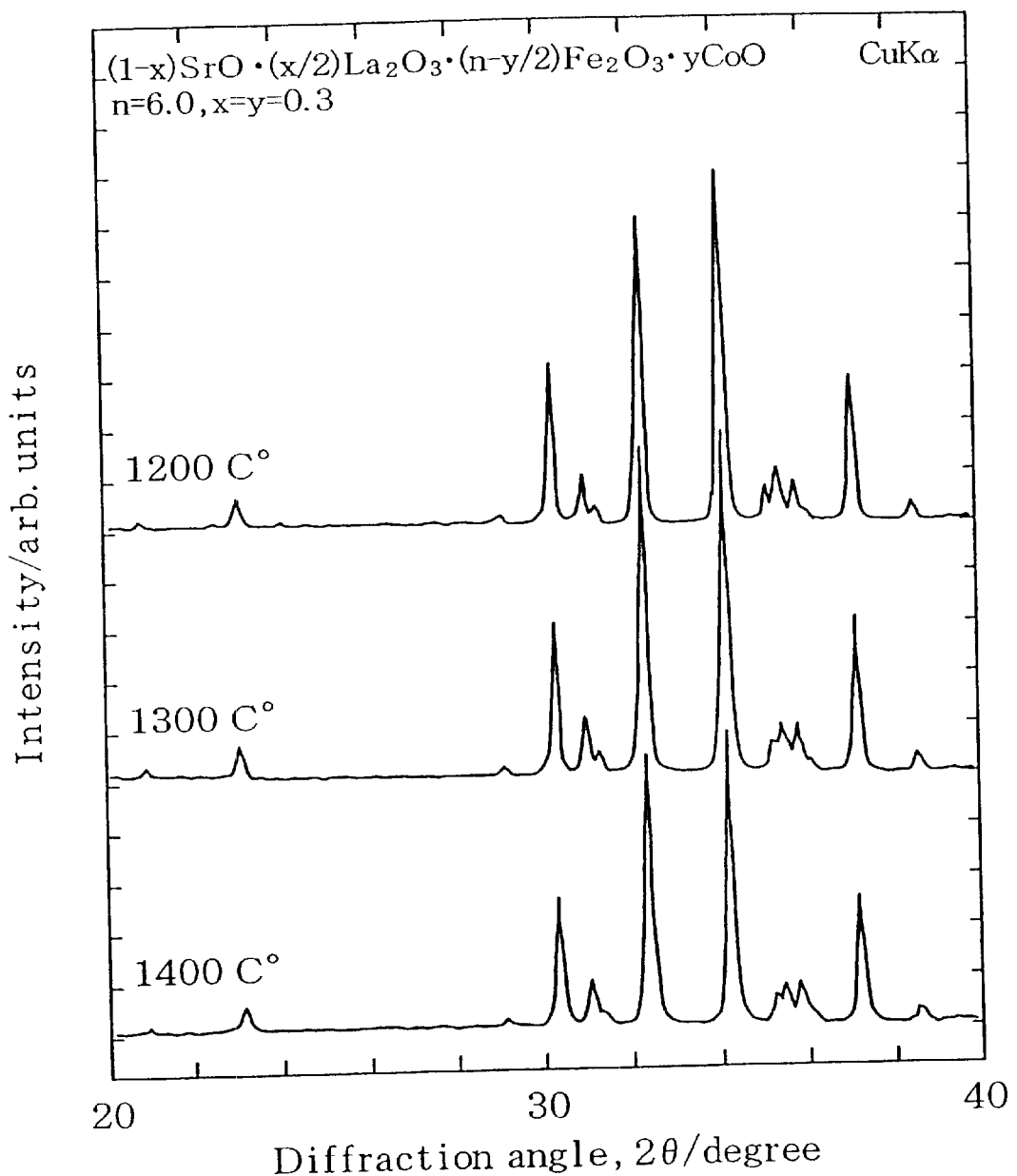
FIG. 4 is a graph illustrating X-ray diffraction patterns corresponding to respective calcining temperatures of 1200, 1300 and 1400° C. in the examples of the present invention.

FIG. 4 illustrates X-ray diffraction patterns for respective calcining temperatures of 1200, 1300 and 1400° C. Apparently, the diffraction patterns hardly depend on the calcining temperature. However, as is clear from the data illustrated in FIG. 1, as the calcining temperature rises, the magnetic anisotropy field $H_A$ of the calcine increases. This is probably because the sites where Fe, is replaced with Co change with the rise or fall of the calcining temperature as described above.

In this manner, by setting the calcining temperature to higher than 1300° C. and equal to or lower than 1450° C. and by replacing Fe with Co, the magnetic anisotropy field $H_A$ can be greatly increased according to the present, invention while suppressing the decrease in saturation magnetization $\sigma_s$.

Hereinafter, an inventive method for producing a ferrite magnet will be described.

First, a calcine is obtained by the above method. Next, the calcine is pulverized into fine particles by performing a fine pulverization process using vibrating mill, ball mill and/or attriter. The average grain size of the fine particles is preferably between about 0.4 and about 0.7 μm (air transmission method). The fine pulverization process is preferably performed as dry and wet pulverization in combination. An aqueous solvent such as water or any of various non-aqueous solvents may be used for the wet pulverization. In the wet pulverization process, slurry is made by mixing a solvent with the calcined powder. Any of known surfactants is preferably added to the slurry.

Thereafter, the slurry is pressed within a magnetic field or without a magnetic field while removing the solvent from the slurry. After the pressing, known manufacturing processes of degreasing, sintering, finishing, cleaning and testing are carried out, thereby obtaining a final ferrite magnet product. The sintering process may be performed in the air at a temperature between 1200 and 1250° C. for about 0.5 to 2 hours. The average grain size of the sintered magnet obtained by the sintering process is between 1 and 1.5 μm, for example.

If the ferrite magnet powder is compounded and cured with flexible rubber or hard and lightweight plastic, a bonded magnet may also be produced. In such a case, the inventive magnet powder is mixed and kneaded with a binder and an additive and then molded. The molding process may be injection, extrusion or roll molding.

According to the present invention, the magnetic properties can be improved by performing the calcination at a relatively high temperature as described above. It is generally believed that the calcining temperature should preferably be low (e.g., about 1200° C.) because the higher calcining temperature will not only make the subsequent pulverization more difficult but also degrade the sinterability. However, according to the present invention, such inconveniences caused by the high calcining temperature are eliminated to set the calcining temperature at as high as 1300° C. or more. For example, before the powder is calcined, the powder is crushed finely and further expansion of the grain size is prevented in some way or other. Or coarsely pulverized particles are finely pulverized using a roller mill or a rod mill.

It should be noted that Sr may be replaced with at least one element selected from the group consisting of Ba, Ca and Pb. Also, La may be replaced with at least one element selected from the group consisting of rare-earth elements including Y and Bi at least partially.

EXAMPLE

First, a source material powder with a composition represented as $(1-x)SrO\cdot(x/2)La_2O_3\cdot(n-y/2)Fe_2O_3\cdot yCoO$, which was compounded such that x=y=0.3, was calcined at 1350° C., thereby preparing the inventive magnet powder.

Next, the magnet powder was finely pulverized to a size of 0.52 μm. Then, $CaCo_3$=0.7 wt % and $SiO_2$=0.4 wt % were added to the resulting finely pulverized powder and blended together. The finely pulverized, blended powder was shaped in a magnetic field and then sintered at 1230° C. for 30 minutes, thereby obtaining a sintered magnet.

The magnetic properties of the resultant sintered magnet were: remanence Br of 0.44T; coercivity $H_{CJ}$ of 4.6×79.58 kA/m; and $(BH)_{max}$ of 4.7×7.958 kJ/m³.

Industrial Applicability

According to the present invention, calcine and magnet powder can have their saturation magnetization and coercivity both improved at the same time. Thus, a magnet with excellent magnetic properties can be produced in accordance with the present invention.

What is claimed is:

1. A magnet powder with a ferrite primary phase represented as $(1-x)SrO\cdot(x/2)La_2O_3\cdot(n-y/2)Fe_2O_3\cdot yCoO$, wherein x and y represent mole fractions, and wherein $0 \leq x \leq 0.4$, $0.1 \leq y \leq 0.4$ and $5.5 \leq n \leq 6.5$, and wherein Fe has a magnetic moment oriented upwardly with respect to a crystal c-axis at a number of sites thereof, and also has an opposite magnetic moment oriented downwardly with respect to the crystal c-axis at another number of sites thereof, and wherein the number of sites oriented in one direction is greater than the number of sites oriented in the opposite direction and Co substitutes for Fe in sites which have a greater number, and wherein said magnet exhibits a magnetic anisotropy field $H_A$ of 1750 kA/m or more and saturation magnetization $\sigma_s$ of 84.78 μWbm/kg or more at room temperature.

2. A bonded magnet containing a magnet powder as recited in claim 1.

3. A sintered magnet made from a magnet powder as recited in claim 1.

4. A method for making a magnet powder, comprising the steps of:

preparing a source material blended powder, in which oxide powders of La and Co are added to powders of $SrCo_3$ and $Fe_2O_3$, respectively;

calcining the source material blended powder at a temperature higher than 1350° C. and equal to or lower than 1450° C., thereby forming a ferrite calcine with the composition of $(1-x)SrO\cdot(x/2)La_2O_3\cdot(n-y/2)Fe_2O_3\cdot yCoO$, where $0.1 \leq x \leq 0.4$, $0.1 \leq y \leq 0.4$ and $5.5 \leq n \leq 6.5$; and pulverizing the calcine.

5. A method for producing a magnet, comprising the steps of:

preparing a source material blended powder, in which oxide powders of La and Co are added to powders of $SrCo_3$ and $Fe_2O_3$, respectively;

calcining the source material blended powder at a temperature higher than 1350° C. and equal to or lower than 1450° C., thereby forming a ferrite calcine with the composition of $(1-x)SrO\cdot(x/2)La_2O_3\cdot(n-y/2)Fe_2O_3\cdot yCoO$, where $0.1 \leq x \leq 0.4$, $0.1 \leq y \leq 0.4$ and $5.5 \leq n \leq 6.5$;

pulverizing the calcine to obtain a ferrite magnet powder; and shaping and sintering the ferrite magnet powder.

6. A method for producing a magnet, comprising the steps of:

preparing a source material blended powder, in which oxide powders of La and Co are added to powders of $SrCo_3$ and $Fe_2O_3$, respectively;

calcining the source material blended powder at a temperature higher than 1350° C. and equal to or lower than 1450° C., thereby forming a ferrite calcine with the composition of $(1-x)SrO\cdot(x/2)La_2O_3\cdot(n-y/2)Fe_2O_3\cdot yCoO$, where $0.1 \leq x \leq 0.4$, $0.1 \leq y \leq 0.4$ and $5.5 \leq n \leq 6.5$;

pulverizing the calcine to obtain a ferrite magnet powder; and forming a bonded magnet from the ferrite magnet powder.

7. A magnet powder with a ferrite primary phase represented as $(1-x)AO\cdot(x/2)R_2O_3\cdot(n-y/2)Fe_2O_3\cdot yCoO$, wherein A is at least one element selected from the group consisting of Sr, Ba, Ca and Pb, and wherein R includes at least one element selected from the group consisting of: rare-earth elements including Y and Bi, and wherein x and y represent mole fractions, and wherein $0.1 \leq x \leq 0.4$, $0.1 \leq y \leq 0.4$ and $5.5 \leq n \leq 6.5$, and wherein Fe has a magnetic moment oriented upwardly with respect to a crystal c-axis at a number of sites thereof, and also has an opposite magnetic moment oriented downwardly with respect to the crystal c-axis at another number of sites thereof, and wherein the number of sites oriented in one direction is greater than the number of sites oriented in the opposite direction and Co substitutes for Fe in sites which have a greater number, and wherein said magnet exhibits a magnetic anisotropy field $H_A$ of 1750 kA/m or more and saturation magnetization $\sigma_s$ of 84.78 $\mu$Wbm/kg or more at room temperature.

8. A magnet made from a magnet powder as recited in claim 7.

* * * * *